Figure 1:
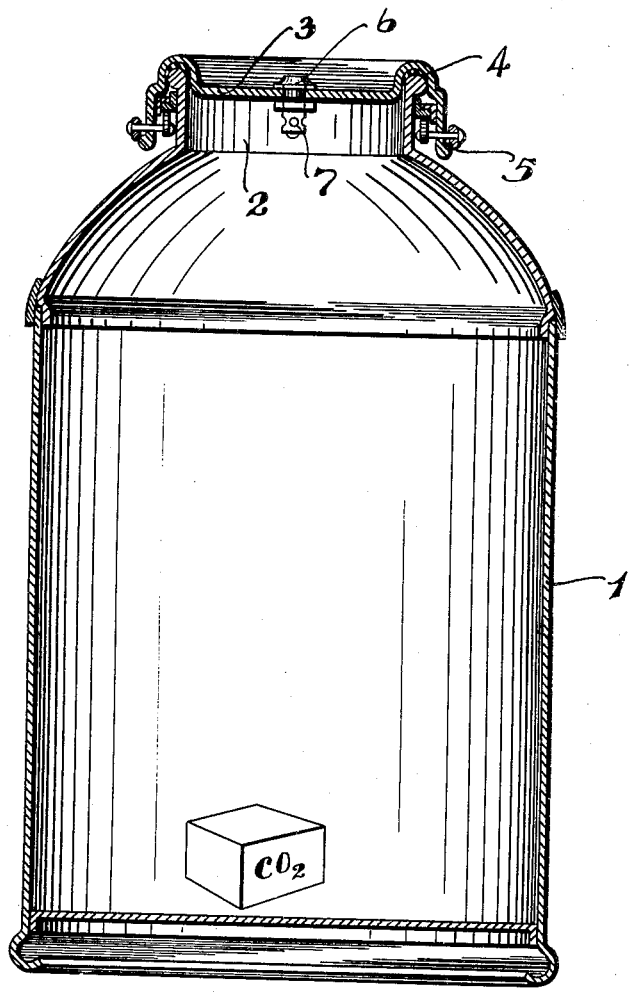

Feb. 14, 1933.  F. N. MARTIN  1,897,939
METHOD OF SHIPPING LIQUIDS
Filed Nov. 4, 1931

FRED N. MARTIN
Inventor

By Herbert E. Smith
Attorney

Patented Feb. 14, 1933

1,897,939

UNITED STATES PATENT OFFICE

FRED N. MARTIN, OF PORTLAND, OREGON

METHOD OF SHIPPING LIQUIDS

Application filed November 4, 1931. Serial No. 572,897.

My present invention relates to an improved method of shipping liquids particularly milk, buttermilk, cream, ice cream "mix", natural fruit juices, and other liquid beverages that are adapted to be carbonated or charged to a desired degree with carbon dioxide gas. In carrying out my new, improved, method of shipping such beverages, I employ a closed and vented container or shipping can, as for instance the well known type of milk can having a closure that is adapted to be sealed, and a vent for the closure.

The supply of carbon dioxide gas is evaporated from solid carbon dioxide located and carried in suitable quantity in the can, and the primary object of my improved method of shipping is to preserve, purify and refrigerate the milk or other beverage.

In the accompanying drawing I have illustrated, as an exemplification of my invention, a milk can that is equipped and used as a shipping container in accordance with my invention, but it will be understood that other types of shipping containers, adapted for my purpose, may be employed in carrying out my invention.

The cylindrical can 1 is of suitable construction and size, and is provided with the usual neck 2 that is closed by the flanged lid 3, gasket 4, and closure fasteners 5 by means of which the lid is secured with a liquid tight and an air or gas tight joint in the neck of the can.

A quantity of solid carbon dioxide, either in crushed form, or in bulk or block form, and indicated as CO₂ is deposited in the can preferably before the milk or other liquid beverage is poured into the can, and the can is filled with the milk to such a level as will provide a gas or air chamber in the neck of the can.

The milk is thus placed in direct contact with the solid carbon dioxide in the can and of course the milk surrounds and covers the solid carbon dioxide in the can.

The quantity of solid carbon dioxide is free to melt or evaporate within the surrounding milk, and as the solid carbon dioxide evaporates, carbon dioxide gas is formed therefrom which expands and permeates the milk contained in the can, and passes therethrough. The expansion of the carbon dioxide gas throughout the milk content expels air from the milk, and as the carbon dioxide gas is heavier than air or has a greater specific gravity than the air, it will be apparent that the carbon dioxide gas remains beneath or below the air as it is expelled from the milk. Under pressure from the expanding carbon dioxide gas the air is lifted from the milk content to the space in the neck of the can above the liquid level, and continued expansion of the carbon dioxide gas, below the air, expels the air through the valved vent 6—7 of the can. The valved vent 6—7 is set to permit expansion of the carbon dioxide gas to expel the air, or most of the air from the can, and to prevent ingress of air from the atmosphere. Should a quantity of air remain in the space above the liquid level, the strata of carbon dioxide gas below the air and above the liquid level forms a guard or blanket of vapor that prevents access of the air to the milk content, and the continued evaporation of the solid carbon dioxide maintains this layer of vapor as a guard for the milk content of the can.

The carbon dioxide gas, by expulsion of the air from the milk renders the milk sterile, and as the presence of air is one of the factors in souring the milk, it will be apparent that such factor is eliminated and the milk is preserved against souring.

The carbon dioxide gas in the milk also forms a refrigerant for preserving the milk, and at the same time the refrigerant destroys or prevents the development of any disease germs that may have been transmitted from the animal and eliminates animal heat from the milk.

Inasmuch as the evaporated solid carbon dioxide in the form of carbon dioxide gas leaves no moisture or liquid residue, it will be apparent that the milk is not subjected to dilution from moisture.

While I have referred to the specific liquid as milk, it will be understood that other liquids may similarly be treated for the purpose of sterilizing, purifying, and refrigerating the liquid content of the container, and maintaining the liquid in healthy condition and free from contamination a sufficient length of time for all practical purposes.

By the use of my method of storing and shipping the milk in cans as described it will be obvious that economy in time, expense, and equipment are secured over the customary manner of employing ice and salt for refrigerating the milk, and the milk or other liquid content may be handled with greater facility than by the well known methods of storing and shipping the above mentioned beverages.

Having thus fully described my invention, what I claim as new and desire to secure by Letters Patent is:—

The method of storing and shipping a liquid in a closed and vented container, which consists in depositing a quantity of solid carbon dioxide in the container, filling the container with liquid to a level forming a gas chamber in the container, permitting the solid carbon dioxide to evaporate and form carbon dioxide gas, allowing the carbon dioxide gas to expand into and occupy the gas chamber, and ventilating said chamber to the atmosphere.

In testimony whereof I affix my signature.

FRED N. MARTIN.